(12) United States Patent
Robinson et al.

(10) Patent No.: US 7,404,414 B2
(45) Date of Patent: Jul. 29, 2008

(54) DISPENSING TOOL ASSEMBLY FOR EVACUATING AND/OR CHARGING A FLUID SYSTEM

(75) Inventors: Randy S. Robinson, Bradford, OH (US); Glenn C. Danner, Miamisburg, OH (US); Matthew A. Smith, Dayton, OH (US)

(73) Assignee: Production Control Units, Inc., Dayton, OH (US)

(*) Notice: Subject to any disclaimer, the term of this patent is extended or adjusted under 35 U.S.C. 154(b) by 279 days.

(21) Appl. No.: 11/417,455

(22) Filed: May 4, 2006

(65) Prior Publication Data

US 2007/0256742 A1 Nov. 8, 2007

(51) Int. Cl.
*F16L 37/28* (2006.01)

(52) U.S. Cl. .................. 137/614; 251/149.1; 62/292; 141/383; 141/59

(58) Field of Classification Search .................. 137/614, 137/614.03, 614.05; 251/149.1; 141/383, 141/385, 59; 62/292
See application file for complete search history.

(56) References Cited

U.S. PATENT DOCUMENTS

| | | | |
|---|---|---|---|
| 4,889,149 A | 12/1989 | Weaver et al. | |
| RE34,426 E | 11/1993 | Weaver et al. | |
| 6,298,886 B1 | 10/2001 | Robinson et al. | |
| 6,539,970 B1* | 4/2003 | Knowles et al. | 137/614 |
| 6,776,186 B2* | 8/2004 | Swinford | 137/614 |

* cited by examiner

*Primary Examiner*—Kevin L Lee
(74) *Attorney, Agent, or Firm*—Jacox, Meckstroth & Jenkins

(57) ABSTRACT

A fluid dispensing tool includes parallel spaced first and second manifolds supporting therebetween an elongated actuator unit having a tubular body confining a piston connected to move a valve actuator stem projecting into a releasable coupler mounted on the second manifold. The manifolds also support therebetween a plurality of elongated valve units each having a tubular valve body defining a valve chamber and a chamber receiving a piston connected to move an elongated valve member. Each valve body has a port for receiving a corresponding fluid supply line or an evacuation line. The first manifold has separate passages connecting air control lines to the piston chambers for moving the actuator stem and each valve member axially. The second manifold has a fluid passage connecting each valve chamber to the coupler, and a handle supports the tool and a finger actuator connected to the coupler.

25 Claims, 3 Drawing Sheets

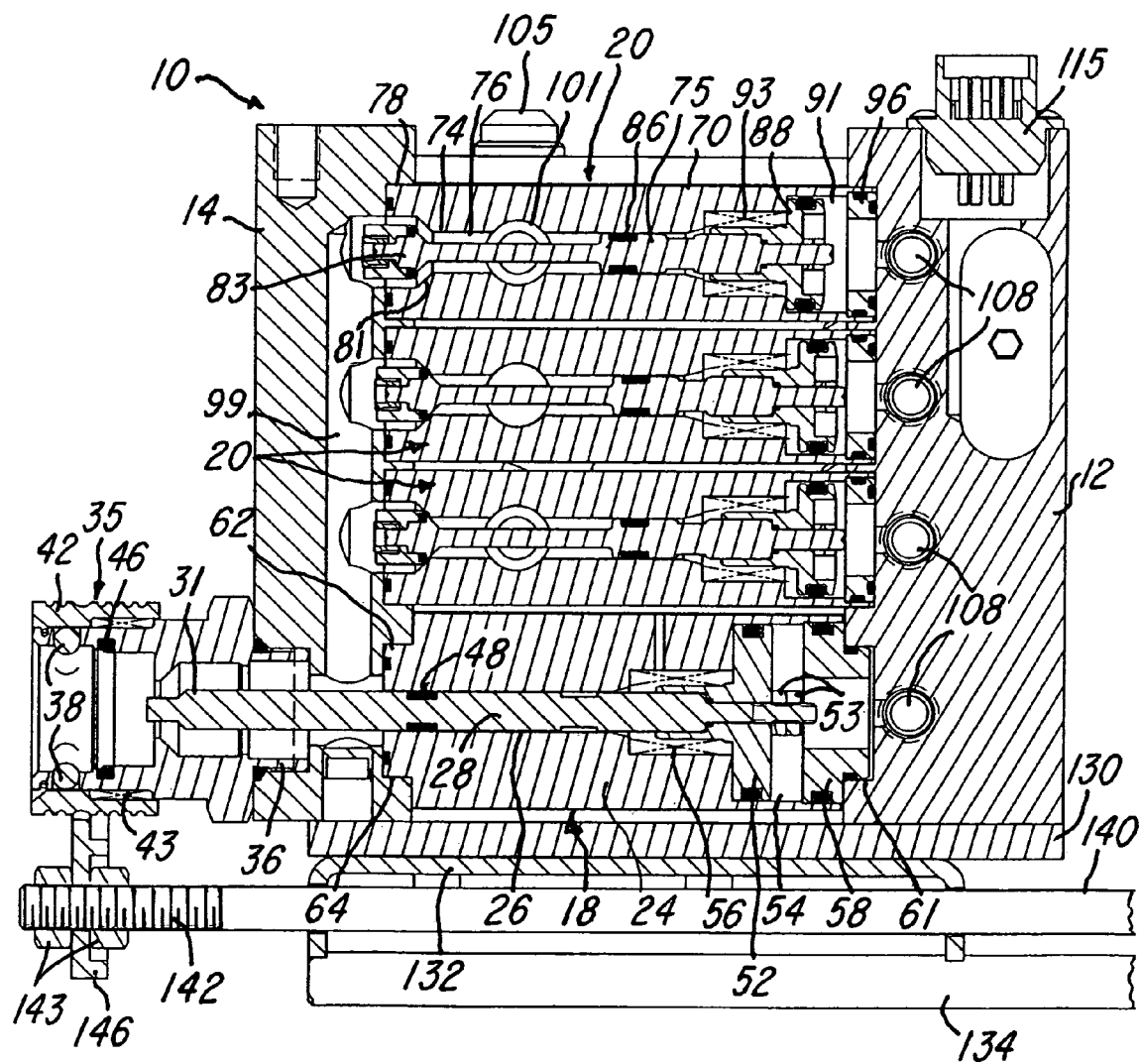

DISPENSING TOOL ASSEMBLY FOR EVACUATING AND/OR CHARGING A FLUID SYSTEM

BACKGROUND OF THE INVENTION

The present invention relates to fluid dispensing tool assemblies for evacuating and/or charging a fluid into a fluid system and of the general type disclosed in U.S. Pat. No. 6,298,886 No. RE34,426 and U.S. Pat. No. 4,889,149 which issued to the assignee of the present invention and the disclosures of which are herein incorporated by reference. Such a tool assembly is commonly used to fill or charge fluid systems such as refrigeration and air conditioning systems and motor vehicle coolant, brake fluid, axle fluid and vehicle air conditioning systems. The tool assembly is usually used for first evacuating the system and then charging or filling the system with a predetermined volume of liquid, including a predetermined volume of lubricating oil for a compressor. Since all of the air in the system is removed during the evacuation cycle, the fluid system is filled to a predetermined level without residual air pockets.

It has been determined that it is frequently desirable to have a dispensing tool assembly which is constructed in modular form so that it may be easily manufactured and assembled to dispense only one fluid or multiple fluids such as dispensing lubricating oil and different refrigerants and either with a provision for first evacuating the fluid system or without evacuating the system when a fluid receiving system does not require evacuation. Such a modular system provides for flexibility in the tool assembly and provides for more economical construction of standard components for the dispensing tool assembly. It has also been found desirable for a tool assembly to provide for an optional actuator which is used to open a valve within the fluid receiving system such as an air conditioning or refrigerant system.

SUMMARY OF THE INVENTION

The present invention is directed to an improved fluid dispensing tool assembly which provides all of the desirable features and advantages mentioned above, including the construction in a modular form so that it may be easily and economically constructed to dispense a variety of different fluids, for example, different refrigerants for air conditioning system used for residential and commercial buildings and for motor vehicles as well as lubricating oil, brake fluid, axle fluid and coolant used in motor vehicles. The dispensing tool assembly also provides for interchangeable components or units which may be quickly and conveniently removed and replaced, for example, if a component has extended use and did not function properly.

In accordance with the illustrated embodiment of a dispensing tool constructed in accordance with the invention, a set of parallel spaced first and second manifolds confine or sandwich therebetween one or more elongated valve units and an optional actuator unit used for opening a valve within a quick-connect coupler of a fluid receiving system. Each of the valve units is constructed with an elongated tubular body which defines a valve chamber receiving an axially movable elongated valve member having on one end a closure portion which engages a valve seat within the valve body. The opposite end of each valve body defines a chamber which receives a piston secured to the valve member, and a compression spring urges the valve member to its normally closed position. Sealing rings form fluid-tight seals between the units and the manifolds, and the first manifold has separate passages for the units for receiving pressurized air control lines for actuating the pistons. Each of the valve bodies has a side port for receiving a corresponding fluid supply line or evacuation line. The second manifold defines a passage which connects each of the valve chambers to the coupler when each of the valve members is shifted to its open position. An optional handle member supports the tool and also a finger actuating lever connected to release the coupler.

Other features and advantages of the invention will be apparent from the following description, the accompanying drawings and the appended claims.

BRIEF DESCRIPTION OF THE DRAWINGS

FIG. 3 is a vertical section of the tool assembly, taken generally on a center plane of the tool assembly shown in FIGS. 1 & 2.

DESCRIPTION OF THE ILLUSTRATED EMBODIMENT

Figure 1:
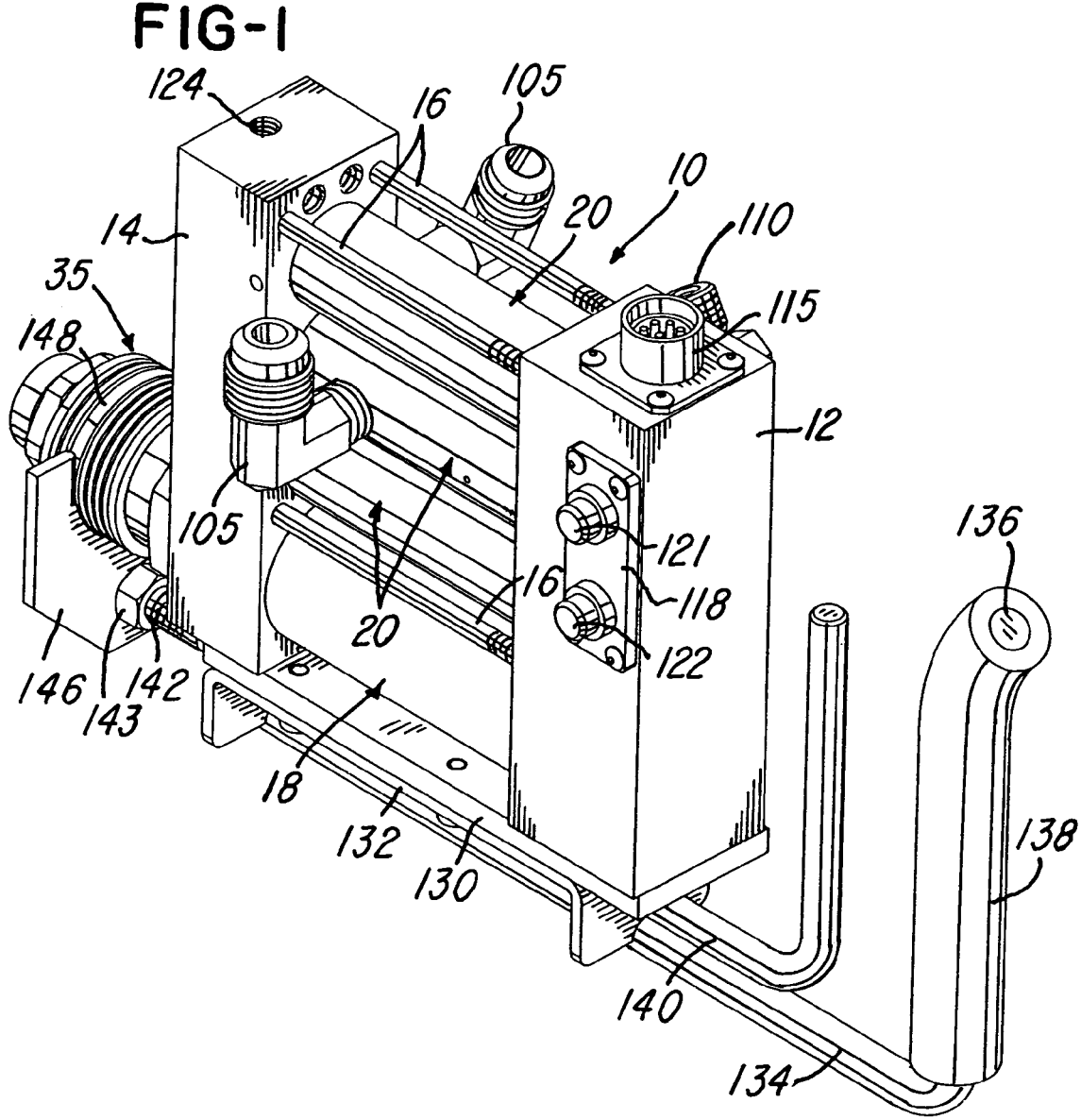
FIG. 1 is a perspective view of one side of a dispensing tool assembly constructed in accordance with the invention.
Figure 2:
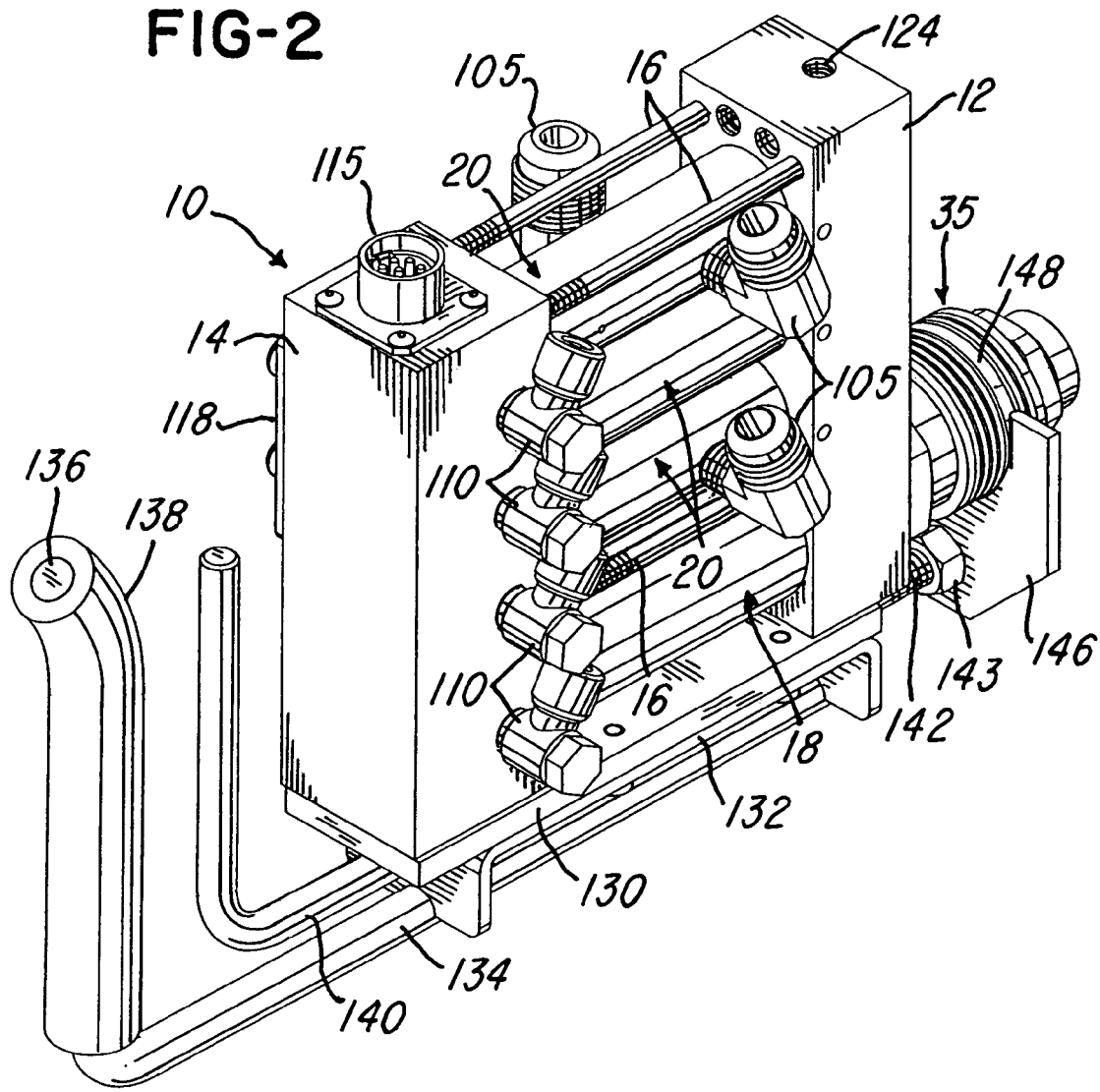
FIG. 2 is a perspective view of the opposite side of the tool assembly shown in FIG. 1.

Referring to FIGS. 1 and 2, a dispensing tool assembly 10 is constructed in accordance with the invention and includes a first elongated manifold 12 and a second elongated manifold 14 which are illustrated in the form of aluminum blocks and are positioned in parallel spaced relation and usually in vertical positions when the tool assembly is in use. The manifolds are connected by a set of elongated threaded tie rods or screws 16 threaded into the manifold 12. Sandwiched or confined between the manifolds 12 and 14 is an optional elongated cylindrical actuator unit 18 and a plurality or three elongated poppet valve units 20.

Referring to FIG. 3, the actuator unit 18 includes a tubular actuator body 24 having a cylindrical outer surface and formed of aluminum. The body 24 has a centerbore 26 which receives an elongated actuator stem 28 having an outer or forward end portion 31 projecting into a quick-connect and releasable tubular coupling 35 having an inner portion 36 threaded into a counterbore formed in the manifold 14. The coupler 35 is of conventional construction and includes a series of circumferentially spaced locking balls 38 confined within corresponding radial holes by a surrounding sleeve 42. The sleeve 42 is retractable against a compression spring 43 to permit the locking balls 38 to shift radially outwardly for releasing the coupler from a mating fitting (not shown). The fitting commonly has an internal valve member adapted to be shifted to an open position by shifting of the actuator stem 28 to an extended position, as shown in FIG. 3. A resilient O-ring 46 is carried by the coupler 35 to form a fluid-tight seal with the fitting received within the coupler.

A resilient annular seal 48 is carried by the actuator stem 28 to form a fluid-tight sliding seal between the actuator stem and the actuator body 24. The actuator stem 28 has an opposite end portion secured to a piston 52 by a set of lock nuts 53, and the piston is supported for axial movement within a piston chamber 54 formed within the body 24. A compression spring 56 urges the piston 52 to a normally retracted position within the chamber 54 and in contact with an annular bushing 58 having a reduced cylindrical portion projecting into a counterbore 61 formed within the first manifold 12. The bushing 58 seats within a slight counterbore formed within the actuator body 24, and resilient O-rings form fluid-tight seals between the bushing 58, the actuator body 24 and the manifold 12. The opposite end of the actuator body 24 has a reduced cylindrical portion 62 which projects into a counterbore 64 formed within the inner surface of the manifold 14, and a resilient O-ring forms a fluid-tight seal between the actuator body 24 and the manifold 14.

Each of the valve units 20 are substantially identical and includes a tubular valve body 70 having a cylindrical outer surface and a cylindrical centerbore 74 which receives an axially movable elongated valve member 75 having a reduced portion defining a valve chamber 76. The valve member 75 is constructed substantially the same as each of the valve members 85 disclosed in above-mentioned U.S. Pat. No. 6,298,886. Each of the valve bodies 70 has an end portion which projects into a corresponding counterbore 78 formed within the manifold 14 and has a tapered annular valve seat 81 adjacent the manifold 14. Each of the valve members 75 has a closure portion 83 which carries a resilient O-ring to form a fluid-tight seal with the corresponding valve seat 81. A resilient annular seal 86 forms a sliding fluid-tight seal between the valve stem or member 75 and the valve body 70.

The opposite end of each valve member 75 is connected to an annular piston 88 which is received within a piston chamber 91, and a resilient O-ring forms a sliding fluid-tight seal between the piston 88 and the valve body 70. A compression spring 93 urges the valve member 75 to the right (FIG. 3) or a normally closed position, and an end portion of each valve body 70 projects into a corresponding counterbore 61 formed within the manifold 12. A sealing ring 96 seats within a slight counterbore of the valve body 70, and resilient O-rings are received within the ring 96 to form fluid-tight seals between the valve body 70 and the manifold 12. Each of the valve chambers 76 is connected to the coupler 35 by an elongated passage 99 within the manifold 14.

As shown in FIGS. 1 and 2, each of the cylindrical valve bodies 70 has a passage or port 101 which extends laterally from corresponding valve chamber 76 and receives a corresponding L-shaped fitting 105 for receiving a fluid supply line or an evacuating suction line commonly formed by a flexible tube. As shown in FIGS. 2 and 3, the manifold 12 is formed with laterally projecting ports or passages 108 which connect with the corresponding piston chambers for the valve units 20 and the actuator unit 18. The passages 108 receive corresponding fittings 110 (FIG. 2) which provide quick connections to corresponding flexible air control lines (not shown) for selectively opening and closing each of the valve units 20 and for actuating the stem 28 within the actuator unit 18. As shown in FIGS. 1 and 3, an electrical socket 115 is mounted on the upper end portion of the manifold 12 and is connected by conductors to an electrical control switch 118 mounted on a side surface of the manifold 12 and having a start button 121 and a stop or reset button 122. A threaded hole 124 is formed within the upper end portion of the manifold 14 and is adapted to receive an eye-bolt used to connect the tool assembly 10 to a counterbalancing support system (not shown) having a depending flexible cable.

An optional elongated plate 130 is connected by screws to the bottom ends of the manifolds 12 and 14 and supports an elongated inverted U-shaped bracket 132 welded to an L-shaped rod 134. The rod forms a handle 136 having a resilient sleeve 138 to provide for gripping and maneuvering the tool assembly 10 when it is supported by the counterbalancing system. The bracket 132 also has a set of aligned holes which receive an L-shaped finger actuated lever 140 having a threaded forward end portion 142. The end portion 142 is secured by lock nuts 143 to a U-shaped yoke plate 146 extending into a groove 148 within the sleeve 42 of the coupler 35. Thus retraction of the lever 140 towards the handle 136 is effective to release the coupler 35 for removing the tool assembly 10 from a valve fitting connected to the fluid receiving system.

As mentioned above, the modular valve units 20 may be used for evacuated a fluid receiving system and charging or filling the system simply by, connecting a flexible fluid supply line and suction line to two of the fittings 105. A suction line may also be connected to one of the fittings 105, a lubricating oil supply connected to another fitting 105, and a refrigerant, such as R-22, supplied by a line connected to another fitting 105. If it is desired for the tool assembly to charge one or more additional fluids into one or more fluid receiving systems, the manifolds 12 and 14 may easily be made longer, and additional valve units 20 may be added for receiving the additional fluid supply lines. When the tool assembly 10 is used to evacuate and/or charge a fluid receiving system which does not have an inlet valve fitting for connection to the coupler 35, the coupler 35 may be connected to or replaced by a simple tubular fitting, and the actuator unit 18 may be replaced by another valve unit 20. The operation of the tool assembly 10 with the remote air control of the poppet valve units 20 and the valve actuator unit 18 is substantially the same as disclosed in above-mentioned U.S. Pat. No. 6,298,886.

From the drawings and the above description, it is apparent that a tool assembly constructed in accordance with the present invention provides desirable features and advantages. For example, the modular units 18 and 20 are interchangeable and are adapted to receive and control the flow of different fluids such as different refrigerants, brake fluid, axle fluid, and coolants. Any of the units 18 and 20 may also be conveniently and quickly replaced in the event that one of the units does not preform properly or requires servicing after extended use. As mentioned above, the manifolds 12 and 14 may also be made in different lengths in accordance with the desired number of valve units 20. For example, the tool assembly may be constructed with only one valve unit 20 or with one valve unit 20 and an actuator unit 18. Thus the tool assembly provides desirable flexibility for handling various fluids and charging various fluids receiving systems.

While the form of tool assembly herein described constitutes a preferred embodiment of the invention, it is to be understood that the invention is not limited to this precise form of tool assembly, and that changes may be made therein without departing from the scope and spirit of the invention as defined in the appended claims.

What is claimed is:

1. A dispensing tool assembly adapted to be releasably connected to a fluid supply line for charging a fluid system, said tool assembly comprising a first manifold and a second manifold arranged in parallel spaced relation, said second manifold having an outlet adapted to be connected to a fluid receiving system, at least one elongated valve unit extending between said manifolds, said valve unit including a valve body defining a valve chamber receiving an axially movable elongated valve member, said valve body having a valve seat adjacent said second manifold and said valve member having a closure portion adjacent said valve seat, a piston chamber within said valve body adjacent said first manifold and receiving a piston connected to move said valve member closure portion axially between open and closed positions, a fluid supply passage within said valve body and connected to said valve chamber, said first manifold having an air control passage connected to said piston chamber and adapted to be connected to a pressurized air control line, said second manifold defining a passage connecting said valve chamber to said outlet when said valve member is in said open position, and said manifolds being connected together with fluid-tight seals between said manifolds and said valve body.

2. A tool assembly as defined in claim 1 and including a plurality of valve units extending between said manifolds, each of said valve units constructed substantially the same as said one valve unit, said first manifold having an air control passage for each of said valve units, and said passage within said second manifold connects said valve chamber within each of said valve units to said outlet.

3. A tool assembly as defined in claim 1 wherein said valve body has a cylindrical outer surface.

4. A tool assembly as defined in claim 1 and including an elongated actuator unit extending between said manifolds and including an actuator body supporting an axially movable elongated valve actuating stem having an end portion projecting into a releasable coupler connected to said outlet, and said actuator body defining a piston chamber receiving a piston connected to move to said valve actuator stem.

5. A tool assembly as defined in claim 4 and including a base plate connecting said first manifold to said second manifold, a handle member connected to said base plate, and a finger actuated movable lever adjacent said handle and connected to said coupler.

6. A tool assembly as defined in claim 1 and including a plurality of elongated threaded rods connecting said first manifold to said second manifold outboard of said valve body.

7. A tool assembly as defined in claim 1 wherein said elongated valve body has one end portion defining said piston chamber adjacent said first manifold and an opposite end portion defining an annular valve seat adjacent said second manifold.

8. A tool assembly as defined in claim 1 wherein said first manifold and said second manifold have counterbores receiving corresponding mating end portions of said valve body.

9. A tool assembly as defined in claim 1 wherein said first manifold has an end surface receiving an electrical control socket and a side surface receiving an electrical control switch.

10. A dispensing tool assembly adapted to be releasably connected to a fluid supply line for charging a fluid system, said tool assembly comprising an elongated first manifold and an elongated second manifold arranged in parallel spaced relation, a releasable coupler connected to said second manifold and adapted to be connected to a fluid receiving system, an elongated actuator unit extending between said manifolds and including an actuator body supporting an axially movable elongated valve actuating stem having an end portion projecting into said coupler, said actuator body defining a piston chamber receiving a piston connected to move to said valve actuator stem, at least one elongated valve unit extending between said manifolds, said valve unit including a valve body defining a valve chamber receiving an axially movable elongated valve member, said valve body having a valve seat adjacent said second manifold and said valve member having a closure portion adjacent said valve seat, a piston chamber within said valve body adjacent said first manifold and receiving a piston connected to move said valve member closure portion axially between open and closed positions, a fluid supply passage within said valve body and connected to said valve chamber, said first manifold having separate air control passages connected to corresponding said piston chambers and adapted to be connected to corresponding pressurized air control lines, said second manifold defining a passage connecting said valve chamber to said coupler when said valve member is in said open position, and said manifolds being connected together with fluid-tight seals between said manifolds and said actuator body and said valve body.

11. A tool assembly as defined in claim 10 and including a plurality of valve units extending between said manifolds, each of said valve units constructed substantially the same as said one valve unit, said first manifold having an air control passage for each of said valve units, and said passage within said second manifold connects said valve chamber within each of said valve units to said coupler.

12. A tool assembly as defined in claim 10 wherein said actuator body and said valve body have cylindrical outer surfaces.

13. A tool assembly as defined in claim 10 wherein said first manifold and said second manifold have outer surfaces forming right angles in lateral cross-section.

14. A tool assembly as defined in claim 10 and including a base plate connecting said first manifold to said second manifold.

15. A tool assembly as defined in claim 14 and including a handle member connected to said base plate, and a finger actuated movable lever adjacent said handle and connected to said coupler.

16. A tool assembly as defined in claim 10 and including a plurality of elongated threaded rods connecting said first manifold to said second manifold outboard of said actuator body and said valve body.

17. A tool assembly as defined in claim 10 wherein said actuator body and said valve body have center axes defining a plane parallel to said first manifold and said second manifold.

18. A tool assembly as defined in claim 10 wherein said separate fluid control passages within said first manifold extend laterally to a side surface of said first manifold.

19. A tool assembly as defined in claim 10 wherein said passage within said second manifold extends longitudinally within said second manifold.

20. A tool assembly as defined in claim 10 wherein said second manifold has counterbores receiving corresponding mating end portions of said actuator body and said valve body.

21. A tool assembly as defined in claim 10 wherein said first manifold has counterbores receiving mating annular inserts within adjacent end portions of said actuator body and said valve body.

22. A tool assembly as defined in claim 10 wherein said second manifold has an upper end portion with a threaded hole adapted to receive a fitting for supporting said tool assembly in suspended relation.

23. A tool assembly as defined in claim 10 wherein said first manifold has an upper end surface receiving an electrical control socket and a side surface receiving an electrical control switch.

24. A dispensing tool assembly adapted to be releasably connected to fluid supply lines for charging a fluid system, said tool assembly comprising a first manifold and a second manifold arranged in parallel spaced relation, said second manifold having an outlet adapted to be connected to a fluid receiving system, a plurality of elongated valve units extending between said manifolds, each of said valve units including a valve body defining a cylindrical valve chamber receiving an axially movable elongated valve member, said valve body having a valve seat adjacent said second manifold and said valve member having a closure portion adjacent said valve seat, a cylindrical piston chamber within said valve body adjacent said first manifold and receiving a piston connected to move said valve member closure portion axially between open and closed positions, a fluid supply passage within said valve body and connected to said valve chamber, said first manifold having separate air control passages connected to said piston chambers of said valve units and adapted to be connected to corresponding pressurized air control lines, said second manifold defining a passage connecting said valve chambers of said valve units to said outlet when each said valve member is in said open position, and said manifolds being connected together with fluid-tight seals between said manifolds and said valve bodies of said valve units.

25. A tool assembly as defined in claim 24 and including an elongated actuator unit extending between said manifolds and including a cylindrical actuator body supporting an axially movable elongated valve actuating stem having an end portion projecting into a releasable coupler connected to said outlet, and said actuator body defining a cylindrical piston chamber receiving a piston connected to move to said valve actuator stem.

* * * * *